Patented Nov. 29, 1938

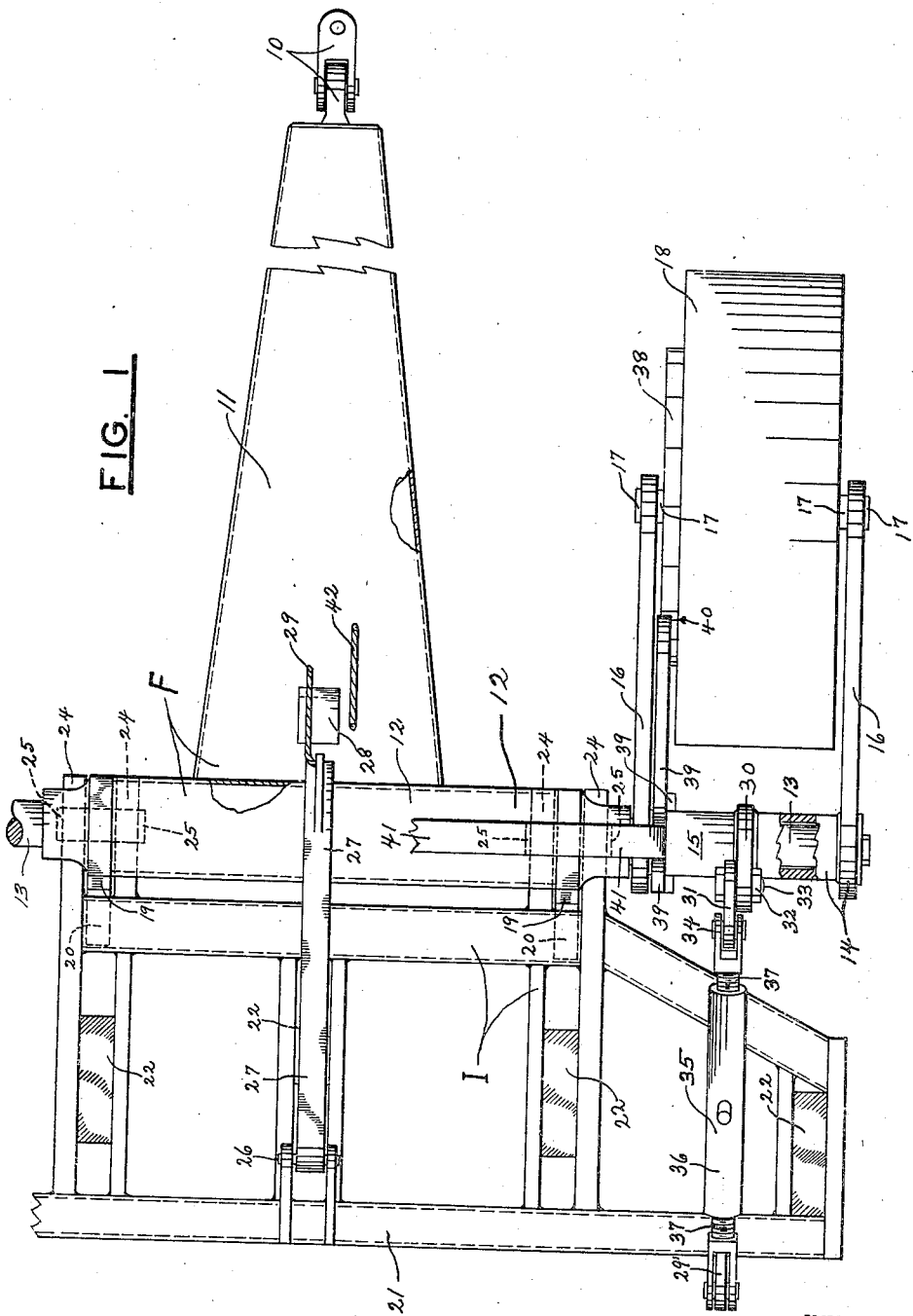

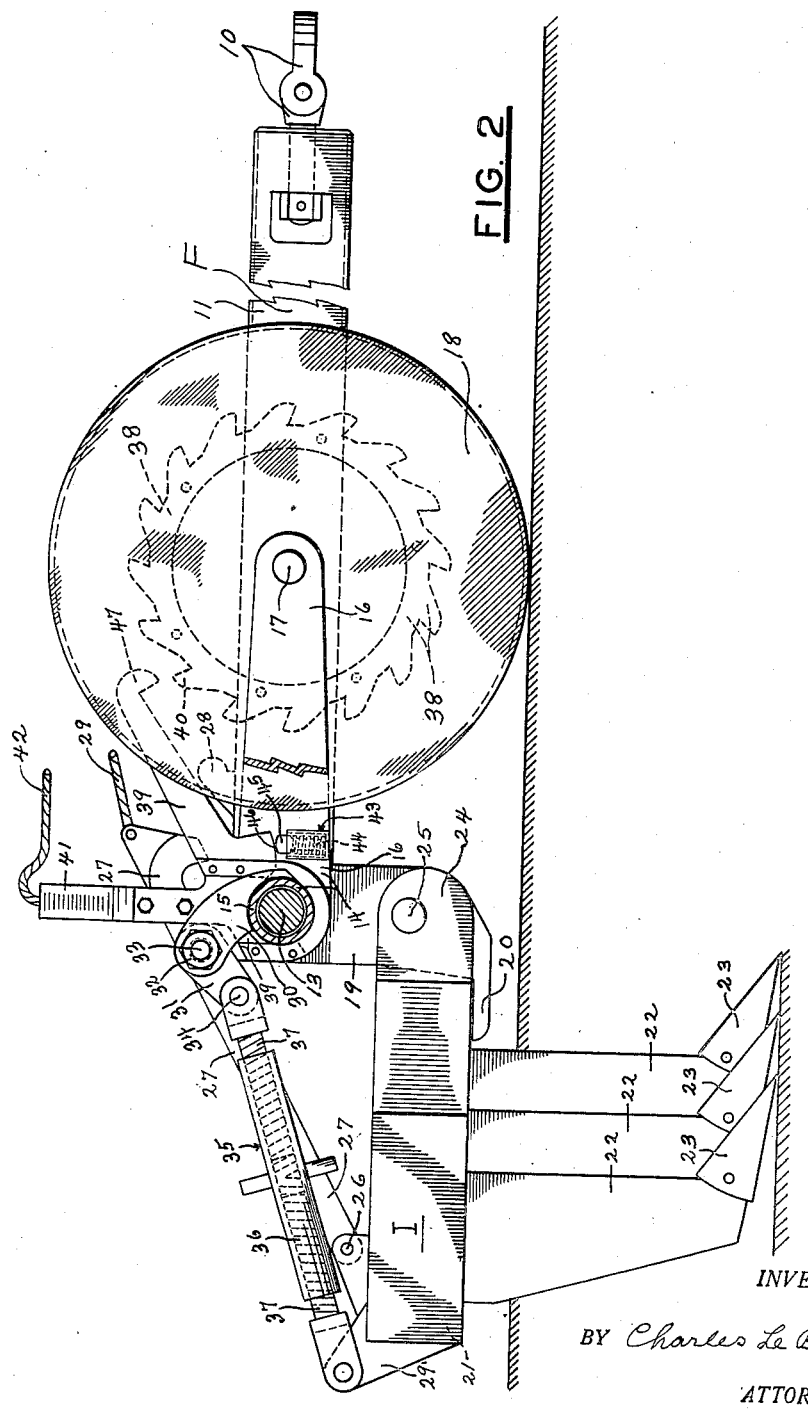

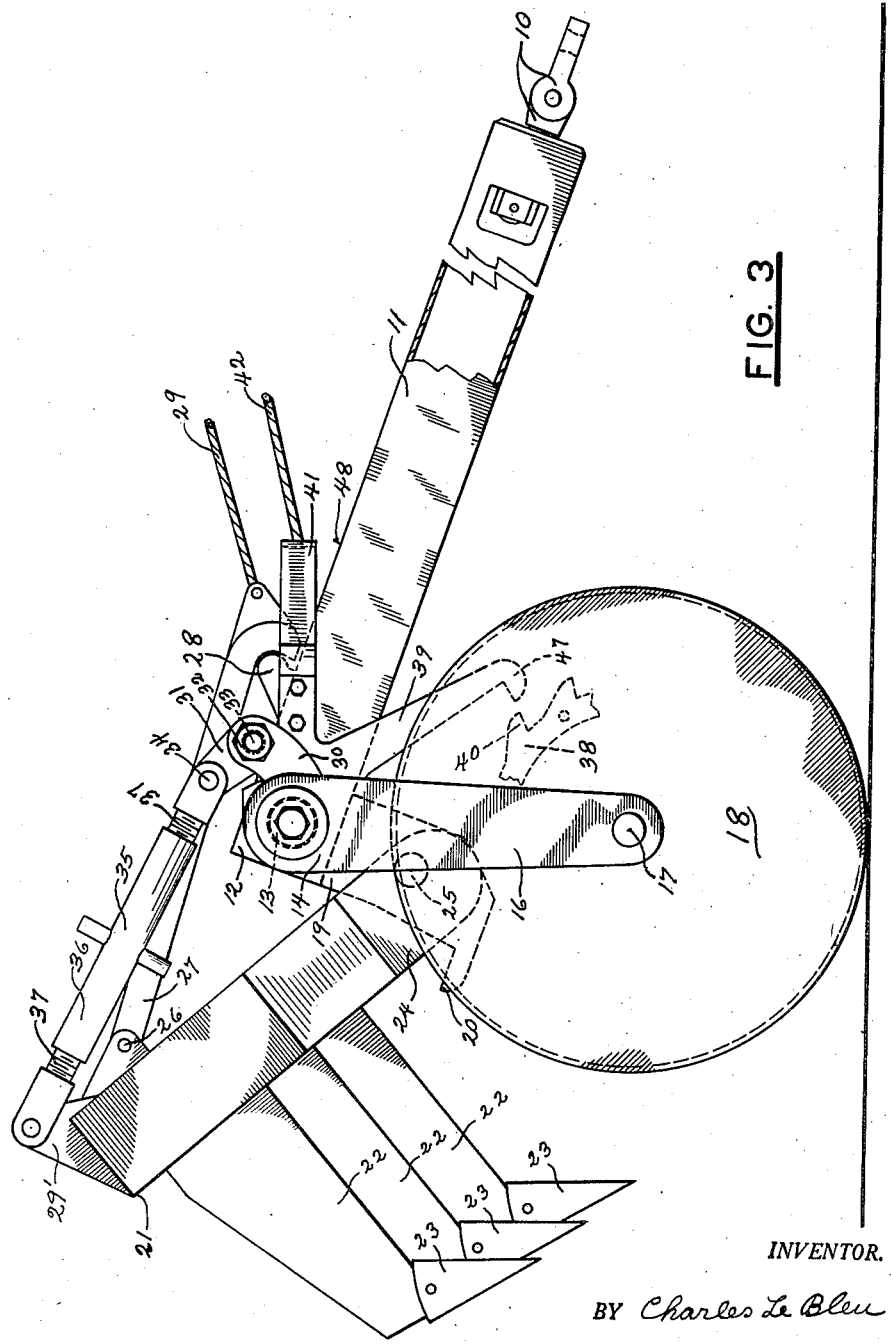

2,138,304

UNITED STATES PATENT OFFICE 2,138,304

EARTHWORKING IMPLEMENT

Charles Le Bleu, Los Angeles, Calif.

Application March 27, 1936, Serial No. 71,242

5 Claims. (Cl. 97—73)

This invention relates to earth working implements of the class variously known as rippers, sub-soilers, scarifiers, cultivators, and the like used in digging up the earth, loosening, or otherwise cultivating or working the earth.

The principal object of the invention is the provision in a machine of the character named; a draft frame adapted at its front end for connection to a tractor to be drawn thereby across a surface to be treated; an implement, including ground working means, hingedly mounted on the draft frame; and mechanism disposed with the machine adapted to operate automatically and adjust the digging depth of the ground working means when the draft force of the tractor varies from a given value.

Another object of the invention is the provision in a machine of the character named, a draft frame adapted at its front end for connection to a tractor to be drawn thereby across a surface to be treated, an implement frame provided with ground working means hingedly mounted on the draft frame for swinging movement in a vertical plane and to be so swung by the draft force of the tractor, and means disposed with the machine adapted to be operated automatically by the swinging movement of the implement frame to adjust the working depth of the ground working means when the draft force of the tractor varies from a predetermined value, and means to fix the value.

Another object of the invention is the provision in a machine of the character named, a draft frame adapted at its front end for connection to a tractor to be drawn thereby across a surface to be treated, an implement frame provided with ground working means hingedly mounted on the draft frame for swinging movement in a verticle plane and to be so swung by the draft force of the tractor, and means disposed with the machine adapted to be operated automatically by the swinging movement of the implement frame to adjust the elevation of the draft frame relative to the surface to be treated when the draft force of the tractor varies from a predetermined value.

Still another object of the invention is the provision in a machine of the class named, of means for mounting ground rollers on the draft frame for swinging movement relative thereto, which means eliminates the necessity for the use of a crank shaft, sometimes referred to as a crank axle, the crank shaft or axle being difficult and expensive to make.

Still other objects and advantages of the invention reside in the details of arrangement and construction of the various parts, members and features, and while I describe and exemplify herein the present preferred embodiment of my invention, still, the invention is susceptible to many modifications and changes in the details of construction and it is therefore to be understood that such changes may be made in the combination, correlation, and construction of parts, members and features, as do not form a departure from the spirit of the invention as defined in the claims.

In the drawings:—

Figure 1 is a fragmentary plan view of my invention in the working position.

Figure 2 is a side elevation, partly in section, of Figure 1 in the working position.

Figure 3 is a side elevation of my invention in the idle position.

Referring now in detail to the drawings, Figures 1, 2 and 3, F designates, in general, a draft frame provided at its front end with a conventional type of mechanism 10 for connecting the draft frame to a tractor. Draft frame F comprises a draft beam 11 having secured to its rear end a cross-beam 12 provided at each of its opposite ends with a horizontally extending trunnion 13.

Journaled on each of trunnions 13 is a bracket 14 comprising, in each, a tubular member or bearing 15 having arms 16 rigidly secured one at each of its opposite ends. The projecting ends of arms 16 are provided with a shaft 17 extending therebetween and having journaled thereon between the arms 16 a ground roller 18.

Adjacent each of the outer ends of cross beam 12 is a downwardly projecting lug 19 provided with an opening and rearwardly projecting stop 20.

Disposed rearwardly of cross beam 12 is an earth working implement I comprising a frame 21 carrying standards 22 provided at their lower ends with ground working tools 23. Standards 22 may be detachably secured to frame 21 in a conventional manner such as with bolts. Frame 21 is provided on its front side with two pairs of lugs 24 disposed one pair adjacent each end of cross beam 12, the lugs of each pair being spaced apart to receive therebetween lug 19 carried by cross beam 12. Pins 25 pass through openings in lugs 19 and 24 and thus the earth working implement I is pivotally secured to draft frame F for swinging movement in a vertical plane.

Pivotally mounted on the implement frame 21 at 26 is a latch bar 27 adapted at its front end to releasably engage a stop 28 mounted relative thereto on draft frame F, said latch bar 27 being laso provided with a pull rope 29 which may extend forwardly to within easy reach of the operator on the tractor.

Secured near each of the opposite ends of implement frame 21 is a lug 29'.

Rigid with the tubular portion 15 of each of the brackets 14 is crank arm 30 having an arm 31 adjustably mounted on its projecting end. The confronting faces of crank arms 30 and arms 31 are corrugated to mesh one with the other in a plurality of adjusted positions and may be held in any adjusted position by tightening the nut 32 on a bolt 33. Thus the nut 32 may be loosened and arm 31 may be swung on crank arm 30 to selectively position the pivot 34 relative to the horizontal axis through trunnions 13, after which the nut 32 may again be tightened to secure arm 31 in the selected position. Thus crank arm 30 and arm 31 together form a crank the effective length of which may be adjusted and is the distance between the axis 13 and the pivot point at 34.

A pair of adjustable hangers 35 are pivotally secured at their rear ends each to a lug 29' and at their front ends each to the outer end of an arm 31, and comprises in each, a tubular portion 36 having right hand threads in one half of its length and left hand threads in the other half and provided respectively in each half with threaded rods 37 adapted at their outer ends for the pivotal connections previously described. Thus by rotating the threaded tubular members 36 the effective length of the hangers 35 may be adjusted resulting in swinging the wheeled brackets 14 to adjust the working depth of the ground working tools 23. In other words, increasing the effective length of hangers 35 will decrease the working depth of the ground working tools, and decerasing the effective length of hangers 35 will result in increasing the penetration of the ground working tools 23.

Secured to the confronting sides of each of the pair of wheels 18 is a toothed ring 38.

Swingingly mounted on tubular portion 15 of each of the wheeled brackets 14 and relative to toothed wheel 38 is an arm 39 adapted at its front end to engage teeth 40 of toothed wheel 38 and arrest rotation of ground wheels 18. Arms 39 are cross connected by a cross bar 41 secured at its opposite ends each to an arm 39 and provided between its ends with a pull rope 42 extending thence forwardly to within easy reach of the operator on the tractor.

Secured to the face of each of the inside arms 16 of each of the pair of wheeled brackets 14 and beneath each of the arms 39 is a short tubular member 43, see Figure 2. Disposed within tubular member 43 is a compression spring 44 provided at its upper end with a stub 45 projecting above the upper end of tubular member 43 to contact arm 39 at 46 and yieldably support arm 39 in the idle position shown.

A description of the operation of the invention will now be made.

Viewing Figure 2 which shows the device in an operative position it will be seen that as the draft means draws the device across the surface to be treated the ground working tools 23 will penetrate the surface. When the ground working tools encounter soil which is of a more solid nature than the ground portion of the surface being treated the ground working implement will tend to raise, rotating on pivot 25 which is mounted on the lug 19. As the hangers 35 are connected to the rear end of the earth working implement the hangers will move in a forward direction with relation to the device. As the working implement raises and rotates around pivot 25 this action will also move arm 31 forwardly, and as the crank arm 30 with which it is connected and which in turn is rotatable mounted on trunnion 13 of bracket 14 of the main frame this action will force the bracket 14 downwardly which will tend to raise the draft frame with relation to the surface due to the fact that the forward end of the draft frame is held in position with relation to the tractor. The shaft 17 and the ground wheels 18 will act as a fulcrum forcing arms 16 and brackets 14 upwardly overcoming the weight of the frame interposed thereon. This will raise lug 19 and pivot 25 drawing the forward end of the working implement upwardly and allowing the working tools 23 to pass over the solid soil. The amount of resistance needed to bring about this action may be varied by the amount of weight interposed upon the rear of the frame plus the adjustment of the length of arm 35. Obviously when the resistance to the ground working tools is decreased the working implement will return to its original set position, allowing deeper penetration of the earth working tools. Thus I provide in a machine of the character described, means adapted to operate automatically and adjust the digging depth of the ground working tools when the draft force applied by the tractor varies from a given value, and since tractors of varying horsepower may be used to pull my invention, I provide means for adjusting the effective length of crank arm 30, 31 and thus I have provided means for fixing the value of the draft force at which the automatic adjustment will occur. Attention is particularly directed to the fact that when the machine is in the working position of Figure 2 the latch bar 27 is disengaged and the machine is thus free to operate automatically as described.

The machine may be disposed in the idle position shown in Figure 3 from the working position of Figure 2 by simply exerting a pull on pull rope 42 to engage the outer end 47 off of arm 39 with tooth 40 of the toothed ring 38 thus arresting rotation of the ground rollers 18 resulting in downward and subsequently rearward swing movement of wheeled brackets 14, which movement is assisted by the tendency of the earth working implement I to swing upwardly. This movement will continue until the cross bar 41 rests on the draft beam 11 at 48, and the hook end of latch bar 27 is in position to engage stop 28, whereupon further swinging of brackets 14 results in disengaging the forward end of arms 39 from tooth 40 and the wheels may resume their rolling action and the machine is retained in the idle position of Figure 3 by the engagement of latch bar 27 with stop 28. To resume the working position of Figure 2, a pull is exerted upon pull rope 42 to disengage latch bar 27 from stop 28.

Having thus described my invention, what I claim as new and useful and desire to secure by Letters Patent, is:

1. A machine of the character described comprising: a draft frame adapted at the forward end for connection to a tractor, a trunnion carried thereby, an implement frame pivotally connected to the draft frame in a plane beneath the draft plane and parallel to the trunnion, earth working implements carried by said implement frame, wheel brackets freely pivoted upon said trunnion and extending forwardly thereof, ground wheels carried at the forward ends of said wheel brackets and pivotal connecting means between the wheel brackets and the rear of the implement frame whereby a pull upon the draft frame in the draft plane with the earth working implements in working position will tend to swing the implement frame upwardly around its pivotal mounting on the draft frame and will tend to lift the rear of the draft frame from the pivotal axis of the ground wheels through force exerted by the pivotal connection between the rear of the implement frame and the wheel bracket.

2. A machine of the character described comprising a draft frame adapted at its forward end for connection to a tractor, a trunnion carried thereby in the draft plane, an implement frame pivotally connected to the draft frame in a plane beneath the draft plane and parallel to the trunnion, earth working implements carried by said implement frame, wheel brackets freely pivoted upon said trunnion and extending forwardly thereof, ground wheels carried by the forward end of said brackets, pivotal connecting means between the wheel brackets in the rear of the implement frame whereby a pull upon the draft frame in the draft plane with the earth working implements in working position will tend to swing the implement frame upwardly around its pivotal mounting on the draft frame and will tend to lift the rear of the draft frame from the pivotal axis of the ground wheels through force exerted by the pivotal connection between the rear of the implement frame and the wheel bracket when resistance of predetermined magnitude is created upon the earth working tools.

3. A machine of the character described, a draft frame adapted at its forward end for connection to a tractor, a trunnion carried by the draft frame in the draft plane, an implement frame pivotally connected to the draft frame in a plane beneath the draft plane and parallel to the trunnion, earth working implements carried by said implement frame, wheel brackets freely pivoted upon said trunnion and extending forwardly thereof, ground wheels carried at the forward end of said wheel brackets, pivotal connecting means between wheel brackets and the rear of the implement frame, means for adjusting the effective length of said connecting means whereby a pull upon the draft frame in the draft frame with the earth working implements in working position and will tend to swing the implement frame upwardly around its pivotal mounting on the draft frame and will tend to lift the rear of the draft frame from the pivotal axis of the ground wheels through force exerted by the pivotal connection between the rear of the implement frame and the wheel bracket when resistance of predetermined magnitude is created against the earth working tools, said resistance being determined by the effective length of the connecting means between the wheel brackes and the rear of the implement frame.

4. A machine of the character described comprising a draft frame adapted at the forward end for connection to a tractor, a trunnion carried thereby, an implement frame pivotally connected to the draft frame in a plane beneath the draft plane and parallel to the trunnion, earth working implements carried by said implement frame, wheel brackets freely pivoted upon said trunnion and extending forwardly thereof, ground wheels carried at the forward ends of said wheel brackets and pivotal connecting means between the wheel brackets and the rear of the implement frame whereby a pull upon the draft frame in the draft plane with the earth working implements in working position will tend to swing the implement frame upwardly around its pivotal mounting on the draft frame and will tend to lift the rear of the draft frame from the pivotal axis of the ground wheels through force exerted by the pivotal connection between the rear of the implement frame and the wheel bracket and means associated with the ground wheel and the implement frame whereby said implement frame will be optionally raised to an idle position after the aforesaid operation.

5. In a machine of the character described comprising a draft frame adapted at its forward end for connection to a tractor, a trunnion carried thereby in the draft plane an implement frame pivotally connected to the draft frame in a plane beneath the draft plane and parallel to the trunnion, earth working implements carried by said implement frame, wheel brackets freely pivoted upon said trunnion and extending forwardly thereof, ground wheels carried at the forward ends of said wheel brackets and pivotal connecting means between the wheel brackets and the rear of the implement frame whereby a pull upon the draft frame in the draft plane with the earth working implements in working position will tend to swing the implement frame upwardly around its pivotal mounting on the draft frame and will tend to lift the rear of the draft frame through force exerted through the pivotal connection between the rear of the implement frame and the wheel brackets when resistance of predetermined value is created against advancing movement of the earth working tools.

CHARLES LE BLEU.